US008736714B2

(12) United States Patent
Ordoubadian

(10) Patent No.: US 8,736,714 B2
(45) Date of Patent: May 27, 2014

(54) METHODS AND SYSTEMS FOR EMBEDDING CAMERA INFORMATION IN IMAGES

(71) Applicant: Youliza, Gehts B.V. Limited Liability Company, Dover, DE (US)

(72) Inventor: Vahid Ordoubadian, Newport Beach, CA (US)

(73) Assignee: Youliza, Gehts B.V. Limited Liability Company, Dover, DE (US)

( * ) Notice: Subject to any disclaimer, the term of this patent is extended or adjusted under 35 U.S.C. 154(b) by 0 days.

(21) Appl. No.: 13/920,231

(22) Filed: Jun. 18, 2013

(65) Prior Publication Data
US 2013/0278796 A1    Oct. 24, 2013

Related U.S. Application Data

(60) Continuation of application No. 12/657,704, filed on Jan. 26, 2010, now Pat. No. 8,514,298, which is a division of application No. 10/067,463, filed on Feb. 4, 2002, now Pat. No. 7,663,670.

(60) Provisional application No. 60/268,134, filed on Feb. 9, 2001.

(51) Int. Cl.
H04N 5/76    (2006.01)

(52) U.S. Cl.
USPC ............... 348/231.2; 348/231.99; 348/231.3

(58) Field of Classification Search
USPC ............... 348/231.99, 231.2, 231.3
See application file for complete search history.

(56) References Cited

U.S. PATENT DOCUMENTS

| 5,875,249 | A | 2/1999 | Mintzer et al. |
| 6,011,547 | A | 1/2000 | Shiota et al. |
| 6,037,984 | A | 3/2000 | Isnardi et al. |
| 6,273,535 | B1 | 8/2001 | Inoue et al. |
| 6,404,512 | B1 | 6/2002 | Tone |
| 6,532,039 | B2 | 3/2003 | Anderson |
| 6,642,956 | B1 | 11/2003 | Safai |
| 6,650,365 | B1 | 11/2003 | Sato |
| 6,724,945 | B1 * | 4/2004 | Yen et al. ............ 382/274 |
| 6,819,358 | B1 * | 11/2004 | Kagle et al. ............ 348/246 |
| 6,888,568 | B1 | 5/2005 | Neter |
| 6,963,363 | B1 * | 11/2005 | Ohmura ............ 348/231.3 |
| 6,965,395 | B1 | 11/2005 | Neter |

(Continued)

FOREIGN PATENT DOCUMENTS

WO    0056058 A1    9/2000

OTHER PUBLICATIONS

U.S. Appl. No. 60/149,796, filed Aug. 19, 1999, "Method and Apparatus for a Color Imager", 36 pages.

(Continued)

*Primary Examiner* — Kelly L Jerabek
(74) *Attorney, Agent, or Firm* — Stolowitz Ford Cowger LLP

(57) ABSTRACT

The present invention is related to providing, in association with an image, information related to the image capture device used to capture the image. In one embodiment, information related to a first static camera characteristic and camera setting information related to a first captured digitized image is embedded in the first captured digitized image using a watermark. The watermarked information may be used to identify the source or owner of the picture, and/or to aid in the more accurate reproduction of the image.

23 Claims, 7 Drawing Sheets

(56) References Cited

U.S. PATENT DOCUMENTS

| | | | |
|---|---|---|---|
| 6,968,058 B1* | 11/2005 | Kondoh et al. | 380/200 |
| 7,133,073 B1 | 11/2006 | Neter | |
| 7,663,670 B1 | 2/2010 | Orboubadian | |
| 8,310,577 B1 | 11/2012 | Neter | |
| 2001/0035909 A1 | 11/2001 | Kubo | |
| 2002/0071049 A1 | 6/2002 | Bell et al. | |
| 2003/0011684 A1 | 1/2003 | Narayanaswami et al. | |
| 2004/0001608 A1* | 1/2004 | Rhoads | 382/100 |
| 2008/0303909 A1* | 12/2008 | Watanabe et al. | 348/211.2 |
| 2010/0134647 A1 | 6/2010 | Orboubadian | |

OTHER PUBLICATIONS

U.S. Appl. No. 09/496,533, filed Feb. 2, 2000, "Method and Apparatus for Fixed Pattern Noise Reduction", 65 pages.

"Secure Spread Spectrum Watermarking for Multimedia", I.J. Cox, J. Kilian, T. Leighton and T. Shamoon, Technical Report 95-10, NEC Research Institute.

"Modulation and information hiding in images", Smith and B. Comiskey, Proceedings of First International Workshop on Information Hiding, Lecture Notes on Computer Science, Cambridge, UK, pp. 207-226, Jun. 1996.

A.Z. Tirkel, G.A. Rankin, R. van Schyndel, W.J. Ho, N. Mee and C.F. Osborne, "Electronic Watermark", Digital Image Computing, Technology and Applications, Sydney, Australia, 1993, pp. 662-672.

M. Miller, I. Cox, J. Linnartz and T. Kalker, "A Review of Watermarking Principles and Practices", Chapter 18, Published in "Digital Signal Processing in Multimedia Systems", pp. 461-485 (1999).

I. Cox and M. Miller, "A Review of Watermarking and the Importance of Perceptual Modeling", Proc. Of Electronic Imaging '97, Feb. 1997.

EECE 533, "Digital Image Processing Project Report—Image Watermarking in Fourier Domain—Vinicius Licks", Dept. of Electrical & Computer Engineering, The University of New Mexico, Dec. 17, 1999.

Stolowitz Ford Cowger LLP, "Listing of Related Cases", Jun. 18, 2013, 1 page.

* cited by examiner

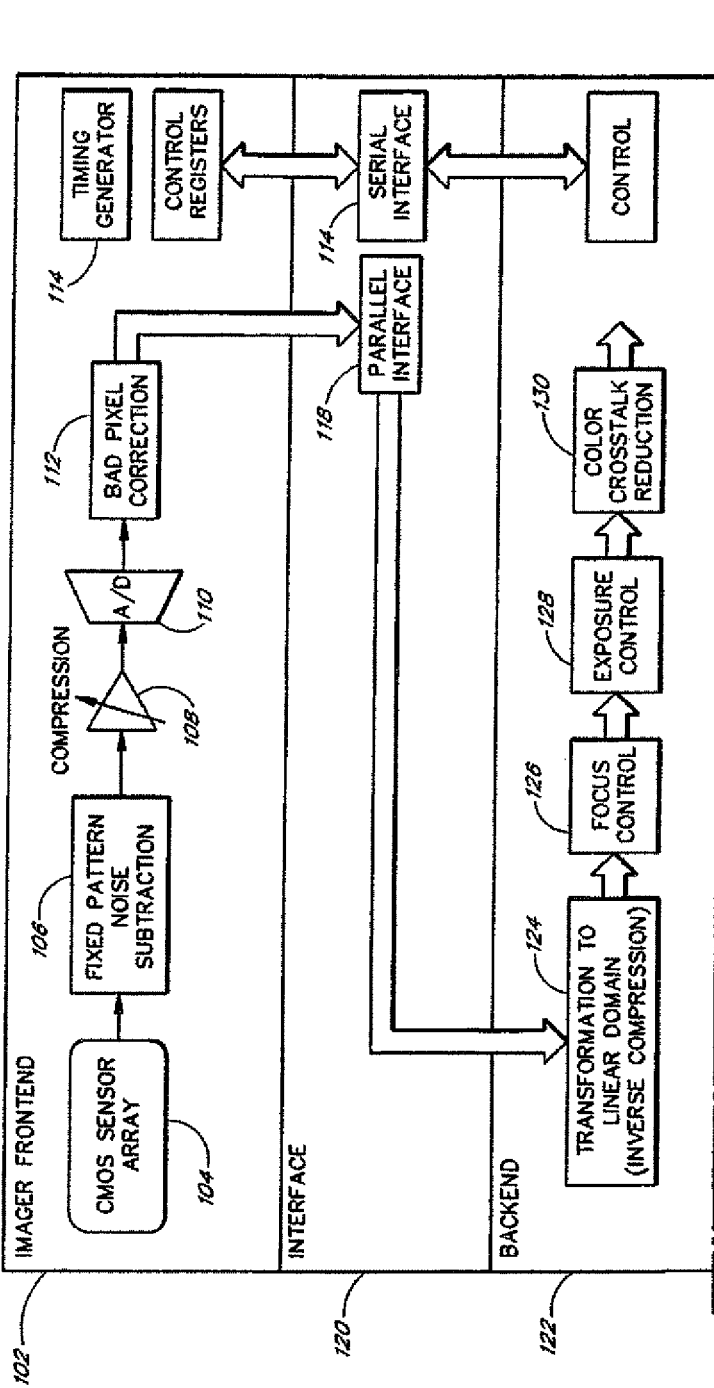
FIG. 1A

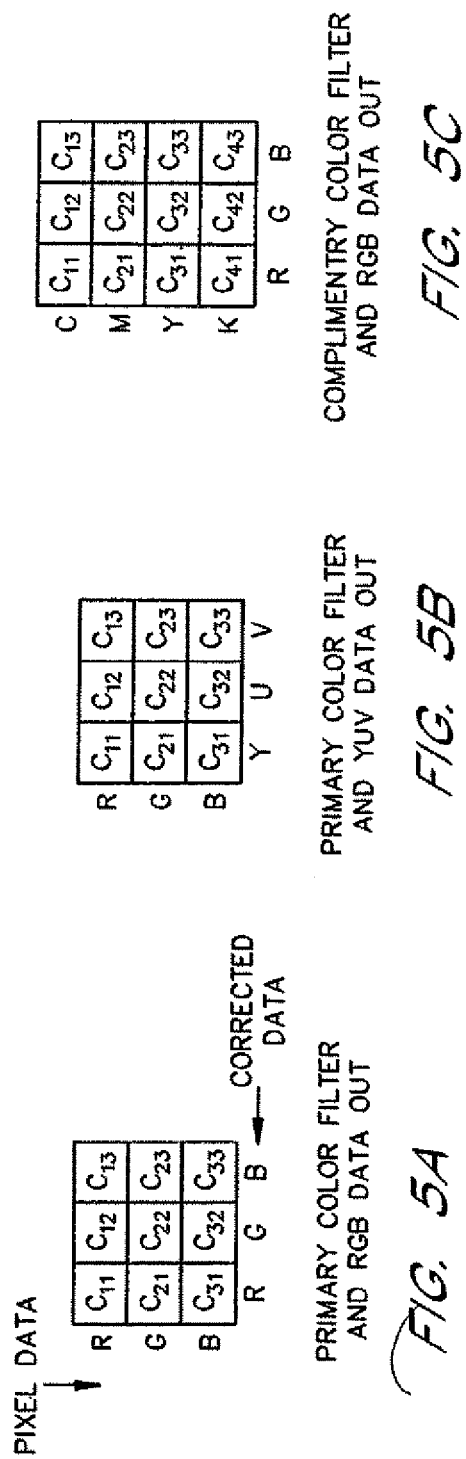
FIG. 5A — PRIMARY COLOR FILTER AND RGB DATA OUT
FIG. 5B — PRIMARY COLOR FILTER AND YUV DATA OUT
FIG. 5C — COMPLIMENTRY COLOR FILTER AND RGB DATA OUT
FIG. 5D — OUTDOOR
FIG. 5E — DUSK
FIG. 5F — FLOURESCENT/TUNGSTEN LIGHT

FIG. 6A

| START IMAGE | JFIF MARKER | JFIF VERSION | QUATNTIZATION TABLE MARKER | START FRAME | START SCAN | COMMENT MARKER | END OF IMAGE |

FIG. 6B

| HEADER INFO | MARKER DATA | QUATNTIZATION DATA | CODE MARKER | START FRAME | AUXILIARY DATA | IMAGE DATA | STOP FRAME | RESV | GAP |

METHODS AND SYSTEMS FOR EMBEDDING CAMERA INFORMATION IN IMAGES

CROSS-REFERENCE TO RELATED APPLICATIONS

This is a continuation application of U.S. patent application Ser. No. 12/657,704, filed Jan. 26, 2010, now U.S. Pat. No. 8,514,298, issued Aug. 20, 2013, which is a divisional application of U.S. patent application Ser. No. 10/067,463, filed Feb. 4, 2002, now U.S. Pat. No. 7,663,670, issued Feb. 16, 2010, which claims benefit of U.S. Provisional Patent Application No. 60/268,134, filed Feb. 9, 2001, all of which are herein incorporated by reference in their entirety.

BACKGROUND OF THE INVENTION (1) Field of the Invention

The present invention is related to digital images, and in particular, to embedding camera-related information in digital images.

(2) Description of the Prior Art

Digital media, such as digital photographs and video, has become increasingly prevalent as the performance of digital cameras and color printers have improved and their cost decreased. In addition, the popularity of the Internet, which facilitates the distribution, via e-mail or Web sites, of digital images has also increased the creation of 15 digital media.

However, images taken using conventional digital media capture devices, such as conventional digital cameras, typically are not adequately reproduced, whether the reproduction is accomplished using an ink jet printer, a color laser jet printer, a thermal wax printer or on a computer display. This failure to adequately reproduce the captured images may be attributed in part to the fact that image capture device performance characteristics are not taken into account. In addition, little or no information is provided by the image capture device on the camera settings used to capture a given image. Further, even when very limited information is provided, the information is provided as a separate file, which is associated with the given image. Thus, the information is not provided as part of a standard image file, such as a JPEG image file.

Because of the deficiencies noted above, users of digital image capture devices are still often dissatisfied with their performance and the resulting images reproductions.

SUMMARY OF THE INVENTION

Various embodiments of the present invention are directed to providing for the enhancement of image reproductions and the authentication of the sources of images.

Thus, one embodiment of the present invention embeds image capture characteristics and/or settings into images capture by the image capture device.

For example, if the image capture device is a digital camera, the digital camera performance or characteristics information may include color correction information, white balance information, filter information, bad pixel information, and/or correction information and correction algorithms for the foregoing. Other types of digital camera performance or characteristics information may include leakage currents associated with the camera imaging sensor, the sensor's dynamic range, the sensor's sensitivity, and so on.

Further, one embodiment of the present invention embeds camera setting information associated with capturing a given image in the given image. For example, the camera setting information may include shutter speed, aperture settings, flash information, such as whether a flash was used and the strength of the flash, the ambient light conditions, and so on. By providing camera setting information, as well as performance or characteristics information, the reproductions of images can be made with greater accuracy. In addition, the image reproductions can be optimized based on the type of image reproductions technology being used. For example, setting and camera characteristic information can be used to optimize the image reproduction process selectively for inkjet printer reproductions, color laser printer reproductions, and reproductions intended to be viewed on a monitor.

One embodiment of the present invention can embed in images authorship and/or source information. For example, a user identifier associated with the image taker may be embedded in corresponding images. In addition, information identifying the image capture device, such as a serial number or substantially unique camera characteristics, may be embedded in images captured with the image capture device. This allows image ownership to be better tracked, allowing for more secure distribution of images and better ensuring that copyright holders are compensated for their work. Further, the use of identifiers or other ownership and/or source information enables the use, transfer and/or sale of captured images to be metered and further enables an automated accounting process for tracking the sale or use of images and assessing charges accordingly. Thus, image owners can be appropriately compensated for the use of their images, and image owners are incentivized to post images for use by others.

In one embodiment of the present invention, some or all of the information described above is embedded into images using a digital watermark, though other techniques, such as the use of a separate file containing the information, may be used as well. The separate file may contain sets of other data as well. The digital watermark may be embedded using, by way of example, either spatial domain techniques or frequency domain techniques. The watermark characteristics may be chosen such so that the watermark will be unobtrusive, that is, not easily perceptible to the unaided eye, robust, that is difficult to remove, and/or unambiguously identify the source or owner of the image. The watermark may be inserted before compression in the base band, or after image compression. If the watermark is inserted before image compression, then the watermark implementation is such as to be substantially preserved in the compressed image.

The watermark may optionally be created using a novel key seed technique, wherein the seed is related to or based at least in part on one or more selected characteristics of the corresponding image capture device. Image capture device characteristics may be selected on their likely uniqueness. These characteristics may include, by way of example, pixel gain values, pixel offset values, device leakage currents, the number and/or locations of defective pixels, and so on.

One embodiment of the present invention is a method of embedding camera information and image capture related information in a digital form of an image, comprising receiving information on a first static camera characteristic, receiving camera setting information related to a first captured digitized image, generating an encryption key based at least in part on the first static camera characteristic, embedding a watermark in the first captured digitized image, wherein the watermark contains at least a portion of the information on the first static characteristic and at least a portion of the camera setting information related to the first captured digitized image, and encrypting the watermark using the encryption key. The first static camera characteristic may be, by way of example, a camera image sensor bad pixel characteristic, may be related to sensor current value, or may be related to a camera image sensor sensitivity. The camera setting information can include information related to the flash intensity used to capture the first captured digitized image. The method optionally includes information in the watermark related to the ambient light present when the image was captured by the camera and/or includes at least a first dynamically measured camera characteristic.

Another aspect of the present invention is a digital camera system comprising an imager, a first static camera characteristic associated with the imager, a first variable camera setting, a watermark generator used to embed in the form of a watermark at least one of the first static camera characteristic and the first variable camera setting information in an image captured by the camera, and a key generator configured to generate an encryption key used to encrypt the watermark. The watermark generator may be configured to generate watermarks that are visually perceptible or create watermarks that are visually imperceptible. The first variable camera setting may be, by way of example, a shutter speed, an aperture setting, or a flash setting. The first static camera characteristic may be, by way of example, related to an imager current, to defective pixels associated with the imager, or imager gamma information.

Still another aspect of the present invention is a method of extracting camera-related information from an image captured by the camera, the method comprising receiving an image, locating a watermark in the image, extracting from the watermark camera characteristic information and camera setting information associated with the camera used to capture the image, and enhancing the image based at least in part on the extracted camera characteristic information and camera setting information. Optionally, the method further comprises enhancing the image specifically for a reproduction device which will be used to generate a reproduction of the enhanced image. By way of example, the camera characteristic information includes a pointer into a gamma correction lookup table. The lookup table can be stored external to the camera. The camera characteristic information can optionally include F number-related information.

The method optionally further comprises selecting a filter algorithm based at least in part on the F-number related information. Another aspect of the present invention is decrypting the watermark utilizing information associated with the camera.

The information associated with the camera is, in one embodiment, related to at least the number of bad pixels of an imager included in the camera.

Still another aspect of the present invention is a method of extracting camera-related information from an image captured by the camera, the method comprising receiving an image, locating a watermark in the image, extracting camera setting information associated with the camera used to capture the image from the watermark, receiving information relating to the gamma of a targeted reproduction device, and enhancing reproductions of the image made by the targeted reproduction device based at least in part on the extracted camera setting information and the gamma related information.

One aspect of the present invention is a method of including camera information and image capture related information in association with a digital form of an image, the method comprising, capturing an image, digitizing the image, receiving information on a first static camera characteristic, inserting in a data set associated with the digitized image at least a portion of the information on the first static characteristic, and transmitting the digitized image and the data set to an image processor.

BRIEF DESCRIPTION OF THE DRAWINGS

In the accompanying drawings forming a material part of this description, there is shown:

FIGS. 1A-B illustrate an example of a digital image capture device which may be used with one embodiment of the present invention;

FIGS. 5A-F illustrate example information which may be embedded into or transferred with an image; and FIGS. 6A-B illustrate example file headers used to transfer camera and image capture related information with the image.

DESCRIPTION OF THE PREFERRED EMBODIMENTS

One embodiment of the present invention is directed to including or embedding imaging device characteristics information and/or camera setting information in or in association with images taken with the imaging device. This information may later be used to reproduce the images with greater fidelity and accuracy than would be otherwise practically achieved.

Further, as will be described in greater detail below, the above information, as well as source and ownership information, may be embedded in images using a digital watermark or signature. Advantageously, a strong key may be created to embed the watermark or signature using the imaging device's characteristics as seed data used to produce the key.

One embodiment of the present invention will now be described in greater detail with reference to FIGS. 1-6. Throughout the following description, reference will be made to various implementation-specific details, including, for example, image device types and architectures, encoding and compression standards, reproduction devices, watermarking techniques, and image enhancement techniques. These details are provided in order to fully set forth a preferred embodiment of the invention, and not to limit the scope of the invention. The scope of the invention is set forth in the appended claims.

Figure 1B:
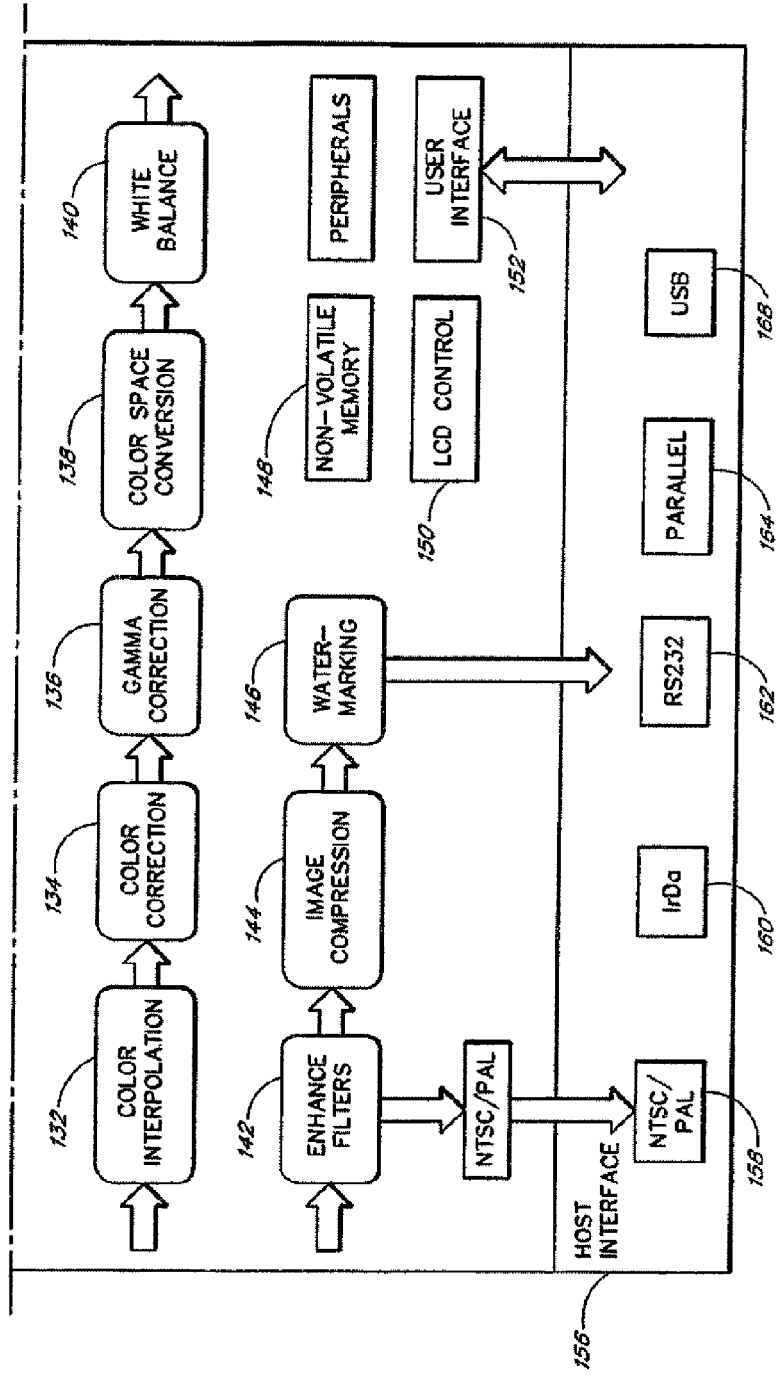

FIG. 1 illustrates an example imaging device in the form of a digital camera 100 which may be used with one embodiment of the present invention. Of course other imaging devices, such a video camera, may be used as well. In the illustrated example, the digital camera 100 includes an imager frontend 102, a backend interface 120, a backend processing section 122, and a host interface 156.

The imager frontend 102 includes an imager in the form of an image sensor array 104. The image sensor array 104 may be, by way of example, a CMOS or a CCD array. If the image sensor array 104 is implemented using CMOS technology, then other digital circuitry, such as some or all of the frontend 102 or backend processing 122 circuitry, can be included on the same substrate as the image sensor array 104. The image sensor array 104 contains an array of pixels which converts photons into electrical signals. Typical digital camera image sensors currently have between 1 and 3 megapixels, though they may have fewer or more pixels. Overlying the sensor array 104 is a color filter array and the lens system used to focus light onto the sensor. The lens system may have a fixed or variable focus length. The lens system may optional have zoom capabilities. In addition, the example imager front end 102 includes a fixed pattern noise subtractor 106, an analog compression system 108, an analog to digital converter 110, and a bad pixel correction circuit 112.

The image sensor output is provided in the form of one or more analog signals to the fixed pattern noise subtractor 106 which subtracts or removes known noise inherent in the image sensor. Variation between pixels-to pixel voltage fluctuation is a principle source for fixed pattern noise. Standard Correlated Double Sampling (CDS) techniques are deployed to reduce to this type of noise.

Another source of noise results from dark currents, that is, leakage current which is present even if no light is present. This type of noise may be compensated through the use of offsets which compensate for the dark currents. The resulting corrected signal undergoes analog compression by the analog compression circuit 108. The compressed signal is then converted into a digital signal by the A/D converter 110. The digital signal is provided to a bad pixel correction circuit 112 which detects and/or corrects for bad or defective pixels, that is, pixels whose response is outside of a desired range. Bad pixels may be due to process non-uniformity and yield issues.

Once the bad pixel correction is performed, the resulting digital information is transferred via an interface 118, which may be a parallel or serial interface, to the backend processing system 122. In addition, information from other sensors, such as ambient light sensors and focusing sensors, may also to provided to the backend system. In response to sensor readings, the backend processing and control circuitry appropriately controls the camera aperture settings, shutter speed, flash, and lens focusing.

The digitized, corrected image received over the parallel interface 118 is transformed into the linear domain by an inverse compressor 124, which provides mapping enhancement for the inverted pixel non-linearity. In response to the focus sensor and light sensor readings, the focus 126 and exposure 128 systems automatically moves the camera lens to create a sharp focused image on the imager array 104. Typically, the exposure time is controlled and manipulated by adjusting the integration time and the gain level.

Color crosstalk, which is caused by electrons diffusing into neighboring pixels so that a pixel of a specific color suffers a reduction in color sensitivity and "pollutes" neighboring pixels of different colors, results in overall reduced color fidelity. The color crosstalk is corrected by a color reduction crosstalk system 130.

A color interpolation system 132 reconstructs the missing color components due to color sub-sampling by the color filter layer. A color correction system 134 compensates for deficiencies in the color response of the sensor 104. A gamma correction system 136 inverts the image sensor array exponential response. A color space conversion system 138 converts image color information into a desired color space, such as device dependents color spaces or device independent color spaces. Examples of device dependent color spaces are CMYK and RGB. CMYK specifies the amounts of ink needed to reproduce an ink-based copy of the image. In the RGB color space, the RGB values are expressed as digitized video voltages. Device independent color spaces include CIELAB or CIEXYZ. A white balance circuit 140 adjusts the color gain according the ambient light.

Enhancement filters 142 are used to sharpen or smooth the image. For example, a typical enhance function attenuates the low frequency content of the image and/or emphasizes the high frequency content, thereby sharpening the image. The sharpening function may be performed using a variety of methods, including basic linear filtering using a 3×3 FIR filter or using a more complex non-linear filtering such as conditional un-sharp masking.

A compression system 144 compresses the image data so to fit in a smaller 25 memory size and/or to meet the bandwidth requirements of the host or other interface.

Typically, in order to achieve a smaller image file size, a lossy compression is employed. However, typically, digital cameras allow a user to choose the tradeoff level between image quality and image file size by enabling compression and selecting the degree of compression or by disabling lossy compression altogether. A commonly used lossy compression for a still image is JPEG. The JPEG compression process compresses the image in the frequency domain. Frequency domain representation of an image are generally more compact than the spatial domain representation since the frequency transform exploits periodicity and thus reduces or eliminates redundancies. Insignificant image components appear in frequencies having low amplitude. The lossy step truncates these components down to a selected level. The quality of the restored image is generally directly proportional to the truncation level. Using discrete cosine transform, JPEG provides lossy compression with ratios up to 100:1 and higher. Images are typically compressed in ratios of 10:1 to 20:1 to minimize noticeable loss. The more the loss can be tolerated, the more the image can be compressed. Compression is achieved by dividing the picture into tiny pixel blocks, which are halved over and over until the ratio is achieved. Other standard file formats which may be used include, by way of example, MPEG, TIFF, GIF, and JPEG-lite formats. In addition, a custom or vendor specific file format may be used as well.

After the compression takes place, a watermarking system 146 inserts a visually perceptible or imperceptible signal or data, termed a "watermark," into an image. In one embodiment, the watermark characteristics are selected so that the watermark will be unobtrusive, that is, not easily perceptible to the unaided eye, robust, that is difficult to remove, and/or unambiguously identify the source or owner of the image. The data contained within the watermark can later be retrieved and/or authenticated. The watermark encoding of the image can occur either in the base band domain or the compressed domain. Various watermarking techniques can be used within the scope of the present invention. For example, the watermark can also be embedded before the image compression is performed. However, it is desirable that the watermark be robust enough to adequately survive at least common compression processes.

The watermarked image may then be transferred to a targeted display or print 25 device via an appropriate host interface 156 port, such as an NTSC/PAL port 158 for display on a television, an JrDa infrared port 160 for transfer to an appropriately equipped computer, PDA, cellular phone, or printer, an RS-232 serial port 162, a parallel port 164, a Bluetooth port (not shown), a modem port (not shown), or a USB port 168. All or portions of the backend system 122 may be located within the camera 100, in a separate portable unit, in a personal computer, or a dedicated processing system. In addition some of the backend functions may be duplicated so that they may be performed both within and external to the camera. Thus, for example a user can select to have the raw frontend digitized image provided to an external system for processing. Because external systems are not constrained by the same portability considerations as handheld cameras, the external systems can have greater processing power and can perform relatively better image processing. Alternatively, the user may elect to have the image processed at least partially within the camera and have the processed image output from the camera. Optionally, the user may elect to have both the raw digitized image and the processed image output.

In addition to the processing systems described above, the digital camera 100 typically includes timing generation circuitry 114 that is responsible for producing the necessary clocks, synchronization signals, a circuit for reading the pixel data, and registers for controlling the image sensor array 104 operation. The registers may be set via an interface 116, which may be a serial or parallel interface. Non-volatile memory 148 is provided to store camera characteristics information, as described below, as well as to store embedded code used to operate the camera. A user can control the operation of the camera 100 via a user interface 152 and LCD control 150.

The systems described above can be implemented using one or more integrated circuits and/or software or firmware executing on one or more integrated circuits. The integrated circuits may include signal processing circuits or processors, general purpose microprocessors or microcontrollers, custom processors, and/or state machines.

With respect to the present invention, the particular techniques or systems used to perform the various corrections and enhancements are not critical. For example, many of the correction functions can be performed on the fly, using circuitry tightly coupled to and optionally located on the same substrate as the sensor array 104. Examples of such circuitry and techniques are discussed in co-pending applications, U.S. Provisional Application No. 60/149,796 filed Aug. 19, 1999, U.S. application Ser. Nos. 09/495,971, 09/496,364, 09/496,533, 09/496,607, filed Feb. 2, 2000, and U.S. application Ser. No. 09/659,355, filed Sep. 12, 2000, which are incorporated herein by reference in their entirety.

Information about the digital camera's frontend characteristics are provided within watermarks embedded into photographs, included in the image file header, stored in a separate file, and/or otherwise provided with photographs taken with the digital camera. For example, sensor information, such as the type of sensor, the frequency response of the image sensor, color crosstalk information, pixel gains, pixel offsets, pixel column offsets, pixel row offsets, and/or color information. The color information can include color gains for red, green, and blue pixels if a primary color filer is used, and color gains for cyan, magenta, and yellow pixels if a complementary color filer is used. Noise information, such as dark current and leakage current information, may also be included in the watermark. The frontend characteristics, as well as other camera characteristics, may be measured during the manufacturing phase and stored in the nonvolatile memory 148, which may be in the form of ROM, EPROM, UVPROM, disk drive, or other memory type. This information will then be static, that is, the stored information will not generally change for each image. The information may then be readout for inclusion in the watermark. In another embodiment, as will be understood by one of ordinary skill art, some or all of the characteristics may be measured dynamically, on the fly, using standard instrumentation techniques. For example, currents may be measured using current shunts, and the measurements may then be converted into a digital format using an analog-to-digital converter.

In addition, camera setting and lighting information, corresponding to a given photograph, may also be included in the watermark for that photograph. For example, the camera setting information may include shutter speed, aperture settings, flash information, such as whether a flash was used and the strength of the flash. The ambient light information, for example, may indicate the ambient light intensity, the frequency spectrum of the ambient light, and an indication as to whether the ambient light is fluorescent, tungsten or sunlight. The camera setting information may be provided by the camera controller which controls the settings and by appropriate sensors, such as the ambient light sensor. The setting information, as well as other information discussed below, may be used to optimize later reproductions of the photographs, including reproductions made on or using specific CRTs, LCD displays, inkjet printers, color laser printers, thermal printers and the like.

Other useful information may also be included in the watermark or otherwise provided with images taken by the image capture device. For example, the image capture device serial number, user information, such as a user ID, name, and/or contact information, and time and date information, may be included in the watermark. Color information, such as color gains for Red, Blue and Green pixels in the case of primary color filters, and Cyan, Magenta and Yellow for complementary color filters, may be included as well. The color information may include color correction matrices. FIG. 5A illustrates a correction matrix to be used with a primary color filter with RGB data out. FIG. 5B illustrates a correction matrix to be used with a primary color filter with YIN data out. FIG. 5C illustrates a correction matrix to be used with a complimentary color filter with RGB data out. The information may also include white balance information, flash status, the gain and offset of each pixel, and so on. By way of example, FIGS. 5D-F illustrate triplet 3×3 base matrices used to provide white balance correction for a primary color filter with an RGB data out format. The white balance matrix can define various pixel color types (Bayer pattern or complimentary) as well as different data output types (RGB, YUV, YCrCb). After selecting a desired data output format, the base matrix can provide fixed values setting for different light conditions such as outdoors (FIG. 5D), dusk (FIG. 5E), tungsten (FIG. 5F), and so on. The appropriate color correction and color space conversion matrices illustrated in FIGS. 5A-F may be embedded in the watermark or otherwise associated with the corresponding captured image.

In addition, some or all of the frontend characteristics which, in the aggregate, are substantially unique from camera to camera, may be used as a unique identifier or as a type of serial number related, at least in part, to the camera's physical properties. For example, depending on the size of the image sensor array 104, the array 104 may have between 20 to 3000 bad or defective pixels. Because the number of bad pixels and the distribution pattern of the bad pixels are independently random, the bad pixel information may be used to generate a substantially unique identifier. In addition, as will be described in greater detail below, some or all of the frontend characteristics may also be used to generate a watermark encryption key.

The watermarking process will now be described in greater detail. In an effort to protect the intellectual property associated with such digital media, digital watermarks haven been used to identify the owner of the digital media. Digital watermarks are typically used to hide the ownership data by embedding watermarks containing the ownership data in the images using either spatial domain techniques or frequency domain techniques. Thus, many watermarking techniques suitable for images have been developed and, for the purposes of the present invention, the selection of a particular technique is not in any way critical.

Figure 2:
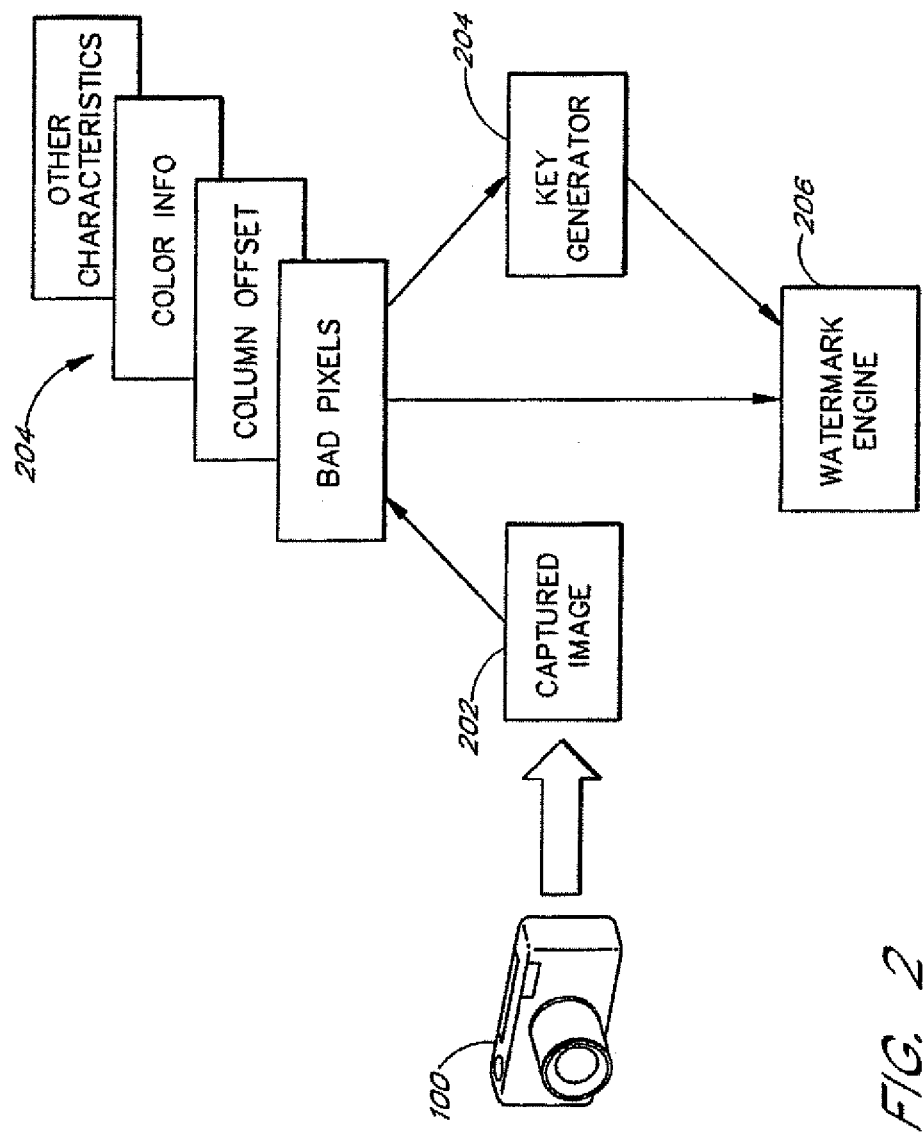
FIG. 2 illustrates an example system for embedding a watermark in a digital image.

FIG. 2 illustrates an example system for embedding a watermark in a digital 10 image. The digital camera 100 captures an image 202. A variety of camera characteristics and settings 204 that affect the quality and color of the image 202 are embedded in the image in the form of a watermark by the watermark engine 206. In addition, some or all of the camera characteristics and settings 204 may be used as a seed by a key generator 204 which generates a key used to encrypt the watermark.

Figure 3:
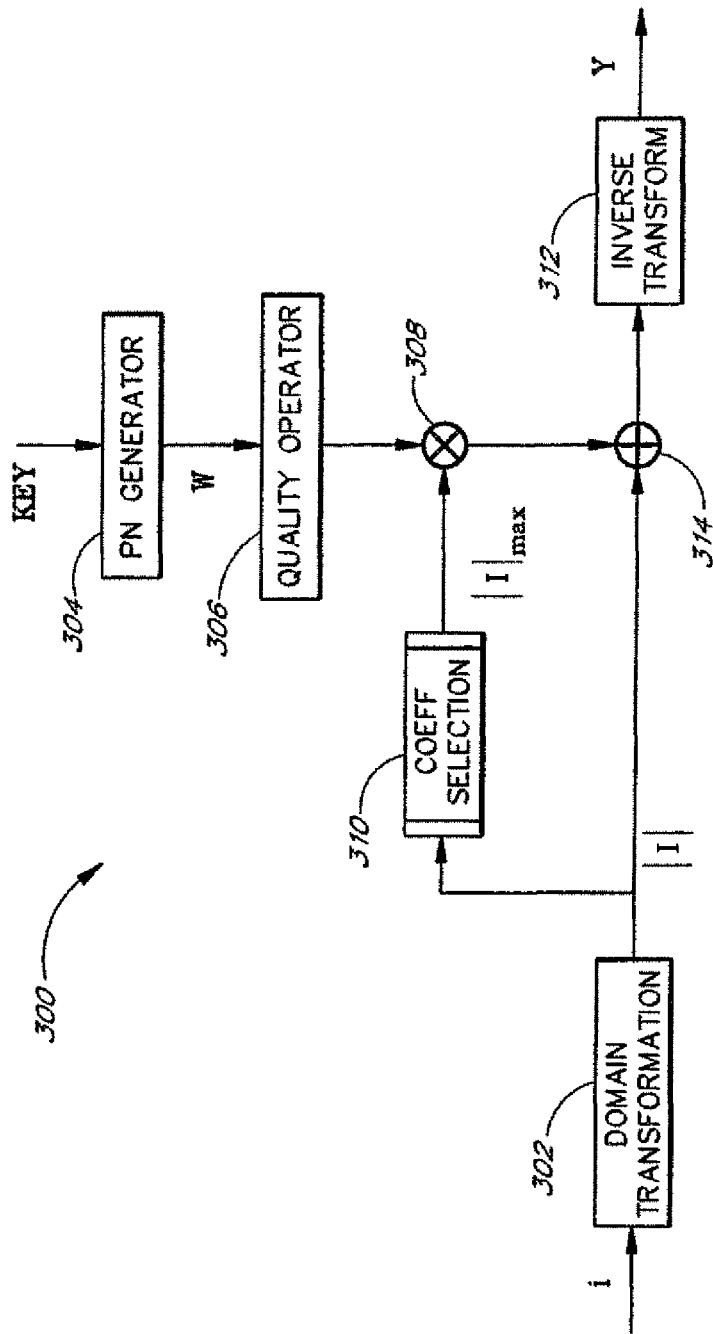
FIG. 3 illustrates an example process for embedding a watermark in the frequency domain of a digital image.

FIG. 3 illustrates one example process flow 300 for embedding a watermark in an image. Some or all of the information discussed above may be provided as a payload to be included in the watermark. The watermark itself may be encrypted using a key generated using some or all of the frontend characteristics discussed above. For example, a pseudo-random number generator 304 may generate a pseudo-random number sequence w using the key, where the key is based on bad pixel information and/or dark current(s) information, as a seed. More than one camera characteristic may be used to generate the key. For example, the key may be generated by dividing the image sensor dark current by the number of bad pixels. Other camera-related currents or voltages, such as those discussed above, may be used as well. Thus, a critical problem in generating a key meeting two important criteria, that of finding a traceable, unique key, is overcome by using frontend characteristics, which meets both criteria.

A quality operator 306 is used to ensure that when desirable, the watermark is not perceptible. For example, for a busy picture, the watermark can be less random, while for a more monochromatic mark the watermark may be made more random. The watermark is then embedded into the image. The watermark may be embedded either in the spatial domain or the frequency domain. By way of example, as is well know to one of ordinary skill in the art, one spatial domain technique embeds the watermark by changing the value of a pixel LSB (least significant bit) at selected locations. However, spatial domain watermarks may not be as robust to attacks as frequency domain watermarks. In addition, frequency domain watermarks may be more likely to survive rotation, scaling and translations of images.

If, as illustrated in FIG. 3, the watermark is embedded using spread spectrum techniques, the image i is transformed into the frequency domain I at state 302. Coefficient selection is performed at state 310. At state 308, the watermark payload is embedded into the image coefficients, which are then summed with the transformed image at state 314. The result is inverse transformed at state 312 to create a watermarked version V of the original image, with the payload information contained therein.

Figure 4:
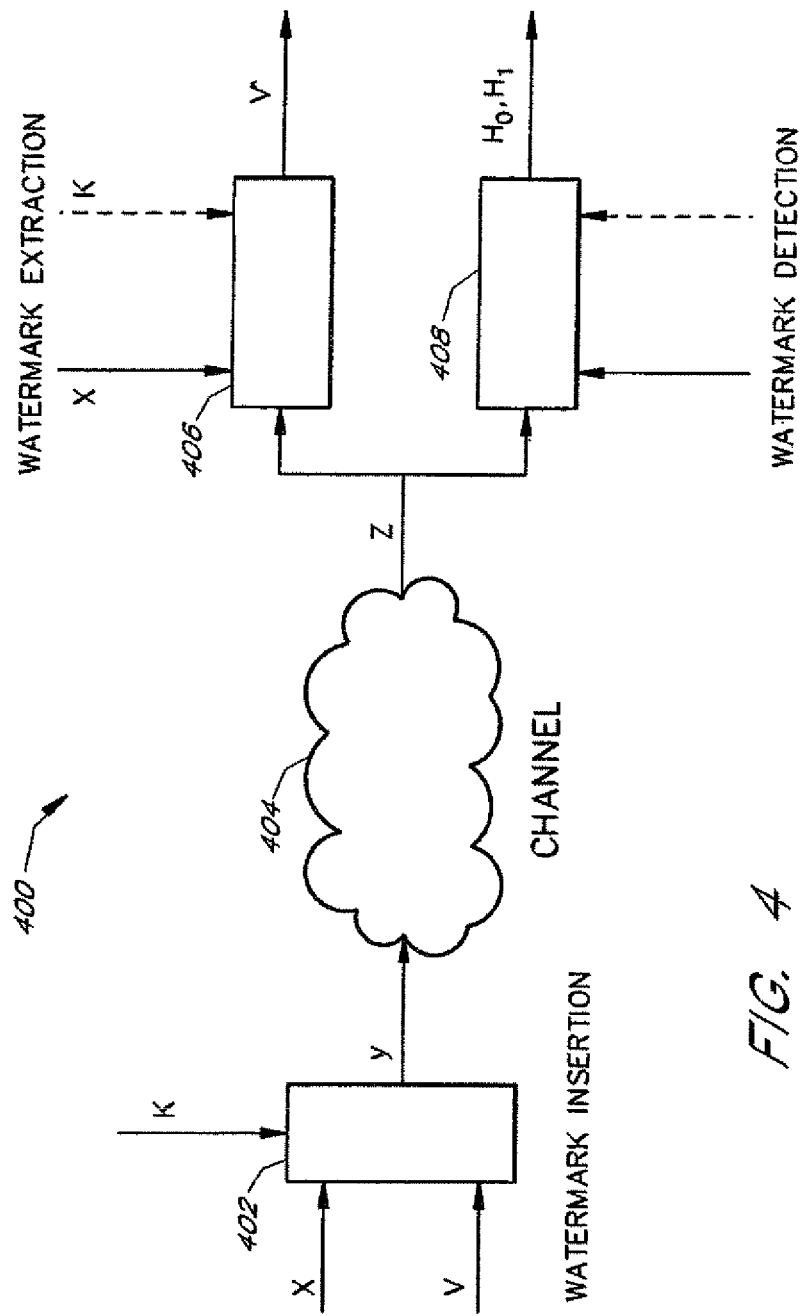
FIG. 4 illustrates an example method of embedding camera and image capture related information in an image information and retrieving the embedded information.

FIG. 4 illustrates one embodiment of an end-to-end process 400 of watermarking insertion and extraction. The watermark insertion process may be implemented as described above with reference to FIG. 3, or may use other well know techniques. An image x is transformed by a watermarking function 402, resulting in a watermarked version of the image y. The function 402 also has as inputs a message or payload V and optionally a key K. If it is desired to keep the watermark payload contents secret from the general public, the key K may be a secret key, provided only to authorized persons or commercial entities. As will be understood by one of ordinary skill in the art, the watermarked image y may be distorted by channel "noise" h 404 which may be caused by unintentional distortions or by intentional attacks intending to destroy, degrade, or modify the watermark. The channel output in this example is the resulting image z, which is related to the watermarked image y by the channel function h 404.

A watermark detector d 408 detects the presence of a watermark in the image z generated using the key K. If the detector 408 determines that the watermark is present, even if in a somewhat distorted or degraded form, using the key K, an extractor e 406 extracts the watermark message or payload V, or an estimate V' if the payload is altered.

Depending on the extraction techniques used, the original, un-watermarked image x may or may not be used in the extraction process. For example, a well known technique for detecting and extracting a watermark utilizing the un-watermarked image is described in "Secure Spread Spectrum Watermarking for Multimedia," I. J. Cox, J. Kilian, T. Leighton and T. Shamoon, Technical Report 95-10, NEC Research Institute. A well know technique for detecting and extracting a watermark without using the original, un-watermarked image is described in "Modulation and information hiding in images," Smith and B. Comiskey, Proceedings of First International Workshop on Information Hiding, Lecture Notes on Computer Science, Cambridge, UK, pp. 207-226, June 1996. Of course other watermarking and watermarking extraction techniques may be used as well.

As previously discussed, rather than embedding the information in the image using a watermark, the camera related data may be included in a file header. FIG. 6A illustrates a standard JPEG hear format. The camera data may be inserted into the JPEG frame data. FIG. 6B illustrates a proprietary file format, wherein data can be segmented and encrypted in a manner that provides a greater freedom in the management of transportation as compatibility with the standard file format is not required and greater freedom in hiding the data can therefore be provided. For example the camera data may be included in an Auxiliary data field.

Once the camera setting and/or information is extracted or retrieved, it can be used to improve reproductions of the images based on the static and dynamic camera characteristic information, as well as on the characteristics of the targeted display or print system, as follows.

The color correction is typically provided using a color conversion matrix as described above, or using the coefficient of a polynomial that converts the measured image signal that has been corrupted by color filter transmission and imager quantum efficiency into a more accurate image signal level. The color conversion matrix, or coefficient of a polynomial, takes into account gain settings and other imager characteristics. Utilizing the color correction information embedded into the image, the reproduction of the image may be enhanced in the post processing application, by optimizing the values of the polynomial and coefficients for the final target device for better matching (e.g. color correction for printers or display monitor).

White balance correction is used to enhance gray areas of images. Whether the camera is selected for auto white balance, or specific settings, the white balance algorithms take "real" or measured image data and converts or modifies the image data to make the gray areas appear more pleasing to the eye. Information on the type of lens filter used if any) and the lighting conditions for a corresponding photograph is useful in performing accurate white balance correction. Thus, one embodiment of the present invention embeds lens filter and lighting condition information in an image so that the white balance correction may be accurately performed off-camera during post-processing. The white balance correction may be implemented using a separate white balance conversion matrix or may be included as part of the color conversion matrix discussed above.

Gamma correction generally controls the overall brightness of an image as well as the ratios of red to green to blue. Images which are not properly corrected may lack contrast or be too dark. Gamma information is therefore useful in ensuring that image colors are accurately reproduced. Thus, it is important to match the imager output with the gamma of the display, such as when the image is to be displayed on a CRT or LCD display or using a video projector.

The gamma information embedded into an image may be in the form of a pointer into lookup table containing gamma correction information, such as the name or location of a gamma correction algorithm suitable for use to correct images captured with the corresponding camera having a given sensor or imager type. Further, the gamma correction algorithm may also be selected based at least in part on the device which will be used to reproduce the image. The gamma correction function is typically not performed equally for all colors or shades of gray within an image. Rather, the gamma correction function is a curve. The gamma function adjusts the variances between the two extremes (white and black) to achieve a non-linear balance and to correct for conditions which have affected the image.

For example, the camera and sensor types or part numbers may be embedded in the image. Based on the camera and/or sensor type, one or more gamma correction algorithms or functions may be identified as being suitable for use with images taken with camera and/or sensor. Then, if more than one algorithm is identified, the algorithm most appropriate for a specified or targeted image reproduction device (CRT display, flat panel display, video projector, color laser printer) is selected. This will allow for post processing and optimizing the captured images for the targeted reproduction device.

By way of example, computer monitors typically have a gamma of 2.5. That is, the intensity to voltage response curve for the monitor is approximately a 2.5 power function. Thus, without gamma correction, if the computer monitor received a command that a certain pixel should have intensity equal to x, where x is between 0 and 1, the monitor will actually display a pixel which has intensity equal to $x^{25}$, that is less than the commanded intensity. Gamma correction is used to adjust the commanded intensity before the command reaches the monitor so that the displayed intensity will accurately reproduce the desired intensity for accurate image reproduction.

The lookup table information may be stored off-camera, such as on a PC or server used to performed color processing. Thus, different camera manufactures and image sensors will be looked up from this table and matched for the correct algorithms.

Average signal level and signal range information, such as the F number and/or integration time, stored in an image may also be used for post processing and optimizing the captured images. By knowing the F number and the integration time, the average luminance incident can be calculated. In addition, the F number affects the imager optical crosstalk which causes blurring or color bleeding in images. This information can then be used to select the appropriate filter algorithm and to automatically optimize the printing or display of the image. In addition, from the stored information, the minimum and maximum luminance may be calculated and utilized to calibrate displays or printers for optimum performance With respect to sharpening algorithms and other filters performed by the backend processing system, by embedding the information in an image, post processing can optionally remove some or all of the sharpening and filtering effects to thereby "retrieve" the substantially real or original image data that was present before the sharpening and filtering. This permits post-processing of the derived raw image data using more powerful and/or user customized sharpening and filtering techniques.

With respect to compression techniques or methods, by transmitting information about the compression method along with the image, post-processing, performed off-camera can filter or clean up the transmitted, compressed image. In particular, lossy compression techniques, which discard or approximate some of the image information, are amenable to such post-processing.

In addition, as previously discussed, when embedded in an image the static camera characteristic information may be used to uniquely identify the camera that is the source of the image. The possessor of the camera can then demonstrate that the camera was the source of the image. This may be accomplished by examining the static camera characteristics of the camera, such as bad pixel information, color sensitivities, and so on, and to determine if they match the corresponding static camera characteristic information embedded in the image. If they match, then there it is likely that the camera was used to capture the image.

In another embodiment, rather than examining the camera directly, some or all 15 of the static camera characteristics are stored in a registry, such as the camera manufacturer's or distributor's database. Because many of the static camera characteristics are measured by the manufacturer, the manufacturer may efficiently store the static camera characteristic information for a given camera in association with another unique camera identifier, such as a serial number. In addition, if the owner of the camera is known, such as by registration of the camera by the owner, the owner's identity may also be stored in association with the static camera characteristic information. Thus, the true camera owner can demonstrate that his or her camera captured the image by comparing the static camera characteristic information retrieved from the image with the static camera characteristic information stored in the registry. If they match, then there it is likely that the camera was used to capture the image.

In one embodiment, rather than embedding static camera characteristic information in an image, the camera serial number or other camera identifier may be embedded in the image. Once the identifier is retrieved, the some or all of the static camera characteristic information is received from the camera vendor or manufacturer.

The static camera characteristic information may be received from a Web site, optical disk, or other site or storage device. The received static camera characteristic information may then be used to enhance or optimize images and image reproductions as previously discussed.

As previously described, camera identifiers, authorship and/or source information can be imbedded in images using watermarks. For example, a user identifier associated with the image taker may be embedded in corresponding images "authored" by the image taker. Further, a user identifier associated with an image owner, who may also be the photographer who captured the image, may be embedded in corresponding images. The image owner may be the owner of the image copyright, or a licensee of the copyright with a right to sublicense. In addition, information identifying the image capture device, such as a serial number or substantially unique camera characteristics, may be embedded in images captured with the image capture device. This allows image ownership to be better tracked, allowing for more secure distribution of images and better ensuring that copyright holders are compensated for their work.

Further, embedding camera identifiers, ownership and/or authorship information 15 images provides the ability to meter the use or transfer of the captured images. Further, using the embedded or watermarked identifiers, an automated accounting process tracks the sale or use of images and assesses, credits, and debits charges accordingly. As discussed in greater detail below, to further enable the automation of the accounting and payment process, each image may have embedded in it a unique image identifier.

For example, if images are posted to a Web site or exchanged via a Web site, an accounting application executing on or in conjunction with the Web site tracks image downloads from the Web site and exchanges of the images via the Web site by users utilizing Internet terminals or the like. The accounting application, using the extraction system described above with respect to FIG. 4 or the like, extracts from the image the camera identifier, authorship identifier, image owner identifier, and/or image identifier. The accounting application automatically determines the appropriate compensation accruing to the owner and/or author of the image by accessing a customer database which stores such compensation information in association with the camera identifier, authorship identifier, image ownership information, and/or image identifier.

The images may have been posted to the Web site by the image owner or by other users who have permission to do so. In order to protect the owner's rights in the image, if the image has been posted without the owner's permission, the owner can request that the image be removed from the Web site.

A fixed price may be charged for each image downloaded or exchanged. Optionally, users may be charged different fees for different images. In this example, the customer database stores the image identifier and use fee for the image in association with the image owner's identifier. Thus, each time the image is downloaded and exchanged, the accounting application utilizes the image owner identifier and/or the unique image identifier as a key to retrieve the use fee associated with the image and to then store in association with the image owner identifier the amount accrued as a result of the download, copying, or exchange of the image. In addition, the user downloading or copying the image will be charged the corresponding use fee. The user may have a prepaid account which can be debited, a credit card that can be charged, or may simply be billed on a periodic basis for downloaded or copied images.

Further, users may optionally be charged different flat fees for images taken by 15 corresponding different photographers. Thus, for example, users may be charged more for images taken by selected well known photographers than for images taken by relatively unknown photographers, regardless of who the image owner is. Therefore, the accounting application retrieves the use fee for a given image by using the author's or photographer's identifier as a key.

Alternatively, users may be charged a flat fee to download, copy or exchange a predetermined number of images, with additional fees for images over and above the predetermined number of images. Different users may have different use plans with different set limits and fees. For example, one user may be charged $10 a month for the right to download 100 pictures a month and may be charged an additional fee for every image downloaded over the 100 picture limit, such as 15 cents a picture. Another user may be charged $100 a month for the right to download 2000 pictures a month and may be charged an additional fee for every image downloaded over the 2000 picture limit, such as 7 cents a picture. The image owner may still be compensated for each downloaded or copied image on an image-by-image basis, or may be paid a flat fee for use of all or a part of the image owner's image library.

in this example, when the user accesses the Web site used to host or exchange the images, a user identifier associated with the user is obtained. The user identifier may be obtained by, for example, retrieving a user ID from a cookie stored on the user's Internet terminal or obtained via a log-in process.

The accounting application utilizes the user identifier as a key to retrieve user account information from the customer database to determine what type of use plan the user has and what, if any, additional fee the user is to be charged for an image. The accounting application utilizes the camera identifier and/or, owner identifier embedded in the image to locate account information for the image owner and to appropriately credit the image owner's account for the download, copying or other use of the image.

If an image contains both a camera identifier and an image owner identifier, one embodiment of the present invention performs a cross-check to better ensure that someone has not improperly embedded an image owner identifier that does not correspond to the actual image owner. The camera identifier is extracted from the image watermark. The identifier is used as a key to access the identity of the registered camera owner from the camera registry database previously described. If the camera owner identifier is not the same as or does not correspond to the image owner identifier extracted from the image, one or more safeguard procedures are performed to better ensure the image is not improperly posted, exchanged, or used and/or to further ensure any credits associated with the downloading, exchange or other transfer of the image is applied to the correct customer account. Thus, the "theft" of an image by improperly embedding inaccurate ownership information is avoided.

For example, if the registered camera owner identity is not the same as the image owner identity extracted from the image, the registered camera owner may be contacted and asked whether the camera is now owned by the user claiming ownership of the image, and if the camera ownership has transferred, when the transfer occurred. If the registered camera owner indicates that ownership of the camera has indeed been transferred to the user claiming ownership of the image, the user claiming ownership of the image is contacted via regular mail or e-mail and asked if the user would like to register as the new owner of the camera. Once the user registers and establishes an account, credits for sales of the user's images are posted to the user's account Optionally, it may be assumed that images dated after the camera ownership transfer occurred belong to the current owner of the camera, even though the image ownership identifier corresponds to the new camera owner and the camera owner identifier corresponds to the old camera owner.

If, instead, the registered camera owner indicates that she or he still owns the camera, the image will not be posted without the registered camera owner's permission and/or without proof that the user owns the image. Additionally, the registered camera owner's identity is also embedded in the image as the image owner's identity, and revenues that accrue as a result of transactions involving the image are posted to the registered camera owner's account. Optionally, the registered camera owner may be required to prove that he or she still owns or controls the camera. For example, the registered camera owner may be required to take a photograph of a time sensitive item, such as a current newspaper, and provide it to the Web site operator. The image is examined and the camera identifier is extracted. If the extracted camera identifier matches the camera identifier extracted from the original image submitted by the user, then the registered camera owner has demonstrated ownership of the original image. Alternatively or in addition, the user who had claimed ownership in the original image may also be provided with the opportunity to demonstrate ownership or control of the camera used to capture the image or otherwise demonstrate ownership of the image.

Thus, as described above, the present invention advantageously embeds in images information about the characteristics and/or settings of the image capture device used to capture the image. This information may be used to enhance reproductions of the captured images using a given reproduction device, as well as to identify the source of the image. Further, in one embodiment, information may be embedded using a watermark encrypted using a key based at least in part on the camera characteristics. In addition, identifiers embedded in or associated with images are used to meter the use or transfer of images.

Although this invention has been described in terms of certain preferred embodiments, other embodiments that are apparent to those of ordinary skill in the art are also within the scope of this invention.

The invention claimed is:

1. A camera, comprising:
an imaging device configured to capture an image, wherein an inherent characteristic associated with the imaging device affects an image quality of every image that the imaging device captures; and
a processing device configured to embed a watermark into the image to generate a watermarked image, wherein the watermark indicates the inherent characteristic associated with the imaging device, and wherein the watermark uniquely identifies the camera based, at least in part, on the inherent characteristic.

2. The camera of claim 1, wherein the inherent characteristic comprises a distribution pattern associated with one or more defective pixels of the imaging device.

3. The camera of claim 2, wherein the distribution pattern indicates both a number of the defective pixels and a location of the defective pixels in the imaging device.

4. The camera of claim 1, wherein the watermark comprises an identical watermark that is applied to all images captured by the imaging device.

5. The camera of claim 4, wherein the watermarked image is generated using the inherent characteristic, and wherein the identical watermark indicates copyright ownership of all the images captured by the imaging device.

6. The camera of claim 1, wherein the inherent characteristic is used to generate the watermarked image, and wherein the inherent characteristic comprises at least one of: color cross-talk information, pixel gain values, pixel row offset, pixel column offset, or current leakage.

7. The camera of claim 1, wherein the processing device is further configured to encrypt the watermark utilizing the inherent characteristic.

8. The camera of claim 7, wherein the watermark is encrypted using a key, and wherein the key is generated based, at least in part, on the inherent characteristic associated with the imaging device.

9. The camera of claim 8, wherein a pseudo-random number generator generates a pseudo-random number sequence using the key as a seed.

10. The camera of claim 1, wherein the watermarked image is transmitted subsequent to the generation of the watermarked image.

11. The camera of claim 1, wherein the inherent characteristic comprises a physical property of the imaging device, and wherein the watermark indicates the physical property.

12. An apparatus, comprising:
means for capturing an image, wherein an inherent characteristic of the means for capturing similarly affects an image quality of every image that is captured; and
means for applying a watermark to the image, wherein the watermark indicates the inherent characteristic, and wherein the watermark uniquely identifies the apparatus.

13. The apparatus of claim 12, wherein the inherent characteristic comprises a distribution pattern associated with one or more pixels of the imaging device.

14. The apparatus of claim 13, wherein the one or more pixels comprise a number of pixels providing a response outside of a desired range, and wherein the distribution pattern indicates a location of the number of pixels in the imaging device.

15. The apparatus of claim 12, wherein the watermark comprises an identical watermark that is applied to all the images captured by the imaging device.

16. The apparatus of claim 15, further comprising means for associating the identical watermark with copyright ownership of all the images captured by the imaging device.

17. The apparatus of claim 12, wherein the watermark uniquely identifies the apparatus based, at least in part, on the inherent characteristic.

18. A method, comprising:
capturing an image with an image capturing device, wherein an inherent characteristic of the image capturing device affects an image quality of every image that is captured by the image capturing device; and
embedding, with the image capturing device, a watermark into the image to generate a watermarked image, wherein the watermark indicates the inherent characteristic, and wherein the watermark uniquely identifies the image capturing device.

19. The method of claim 18, wherein the inherent characteristic comprises a distribution pattern associated with one or more defective pixels of the image capturing device.

20. The method of claim 19, wherein the distribution pattern indicates a location of the one or more defective pixels in the image capturing device.

21. The method of claim 18, wherein the inherent characteristic is used to generate the watermarked image, and wherein the inherent characteristic comprises at least one of: sensor frequency response, sensor current value, or sensor sensitivity.

22. The method of claim 18, further comprising associating the watermark with one or more copyrights to the image.

23. The method of claim 22, further comprising:
receiving the watermarked image;
analyzing the watermark; and
identifying an ownership of the one or more copyrights to the image in response to analyzing the watermark.

* * * * *